Figure 1:
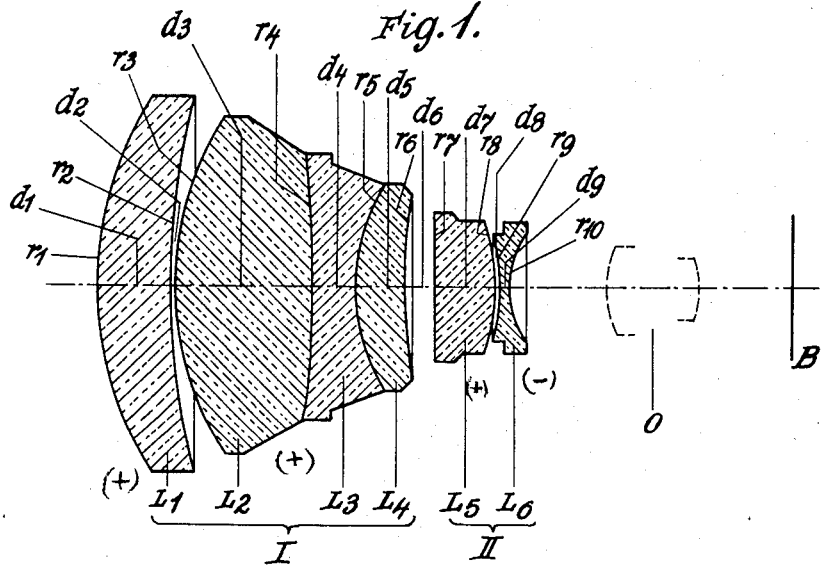

Sept. 18, 1962  W. ALBRECHT ET AL  3,054,327
AFOCAL FRONT ATTACHMENT FOR PHOTOGRAPHIC OR
CINEMATOGRAPHIC OBJECTIVES
Filed Aug. 13, 1959

INVENTORS:
Wolfram ALBRECHT
Werner WAGNER
BY
Paul F. Torr
Agent

United States Patent Office 3,054,327
Patented Sept. 18, 1962

3,054,327
AFOCAL FRONT ATTACHMENT FOR PHOTOGRAPHIC OR CINEMATOGRAPHIC OBJECTIVES
Wolfram Albrecht, Kreuznach, Rhineland, and Werner Wagner, Odernheim (Glan), Germany, assignors to Jos. Schneider & Co., Optische Werke, Kreuznach, Rhineland, Germany, a corporation of Germany
Filed Aug. 13, 1959, Ser. No. 833,590
Claims priority, application Germany Sept. 16, 1958
6 Claims. (Cl. 88—57)

Our present invention relates to an afocal front attachment adapted to increase the effective focal length, and thereby the image scale, of an associated photographic or cinematographic objective.

Front attachments of this type, used frequently (but not exclusively) on 8-mm. motion-picture cameras, conventionally consist of a positively refracting front component, of one or more members, separated by a sizable air space from a negatively refracting rear component which may also include one or more members. Such systems have heretofore been designed with a relatively small number of lenses for an inherent magnification ratio of 2:1, yet with higher ratios the systems became unduly complex if adequate correction of aberrations was to be maintained.

The general object of our present invention is to provide a relatively simple front attachment of this description which affords increased inherent magnification, preferably as high as 3:1, while being fully corrected for spherical, chromatic, comatic and astigmatic aberrations and distortions.

A front attachment according to our invention consists of a four-lens front component and a two-lens rear component, at least two of the lenses of the front component being cemented together to form a doublet or a triplet so that this component consists of two or three air-spaced members each in the form of a positive meniscus turning its convex surface toward the object side of the system. The two lenses of the rear component may be air-spaced from each other or cemented together.

Advantageously, according to a more particular feature of the invention, the first meniscus of the front component is a singlet whose focal length ranges between 1.5 and 2.5 times the focal length of the entire front component. The radius of the convex surface of the first meniscus should be less than the focal length of the front component but greater than four-fifths of that focal length, whereas the radius of the convex surface of the second, cemented meniscus should range between 0.6 and 0.9 times that focal length. Finally, the radius of the cemented surface of the second and third lenses of the front component, both of which are part of the second meniscus, should range between three and five times the focal length of the front component.

We have also found it desirable to select the glasses of the four lenses of the front component in such manner that the arithmetic mean of their refractive indices ranges between a minimum of 1.6 and a maximum of 1.75.

A system satisfying the above conditions has been found free from objectionable aberrations and, in particular, is highly achromatic so as to be especially suitable for the taking of color films.

Figure 2:
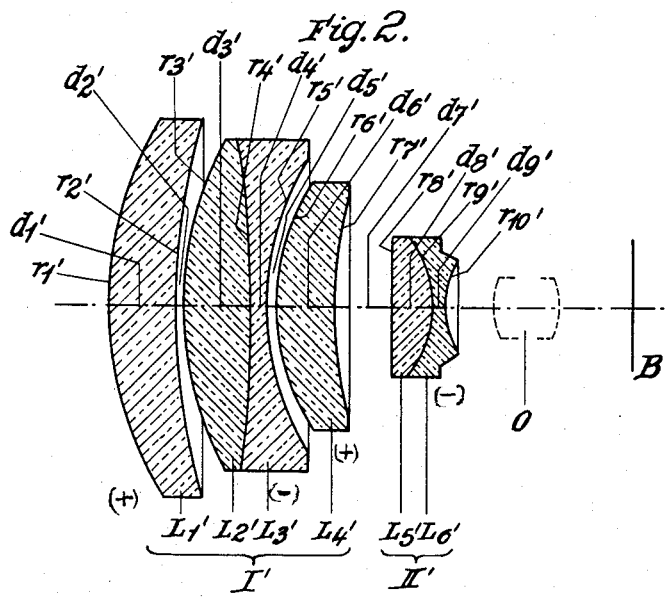

The invention will be described in greater detail with reference to the accompanying drawing in which FIGS. 1 and 2 illustrate two representative embodiments.

The afocal system shown in FIG. 1 consists of a positively refracting front component I and a complementarily negatively refracting rear component II, the two components being separated from each other by a relatively large air space $d_6$ (as compared with the intra-component spacings). An associated principal objective has been indicated schematically at O; its image plane is shown at B.

The front component I consists of four lenses $L_1$, $L_2$, $L_3$ and $L_4$. Lens $L_1$, having radii $r_1$, $r_2$ and thickness $d_1$, is a singlet in the form of a positive meniscus separated by an air space $d_2$ from a similarly meniscus-shaped triplet constituted by the remaining three lenses $L_2$ (radii $r_3$, $r_4$ and thickness $d_3$), $L_3$ (radii $r_4$, $r_5$ and thickness $d_4$), and $L_4$ (radii $r_5$, $r_6$ and thickness $d_5$). The rear component II consists of a positive singlet $L_5$, with radii $r_7$, $r_8$ and thickness $d_7$, and a negative singlet $L_6$ separated from lens $L_5$ by an air space $d_8$ and having radii $r_9$, $r_{10}$ and thickness $d_9$.

Representative numerical values of the radii, thicknesses and separations of lenses $L_1$ to $L_6$ (in millimeters), of their refractive indices $n_d$ and of their Abbé numbers $\nu$ are given in the following Example A for a front attachment designed to co-operate with a camera objective having a focal length of 13 mm. and an aperture ratio of 1:1.8.

EXAMPLE A

| Lens | Radii | Thicknesses and Air Spacings | | $\nu$ |
|---|---|---|---|---|
| | | | $n_d$ | |
| I { $L_1$ | $r_1 = +34.72$ | $d_1 = 7.00$ | 1.62230 | 53.1 |
| | $r_2 = +89.96$ | $d_2 = 0.35$ | air space | |
| $L_2$ | $r_3 = +29.74$ | $d_3 = 13.00$ | 1.62041 | 60.3 |
| $L_3$ | $r_4 = -200.40$ | $d_4 = 5.00$ | 1.75520 | 27.5 |
| $L_4$ | $r_5 = +18.90$ | $d_5 = 5.00$ | 1.66446 | 35.9 |
| | $r_6 = +86.16$ | $d_6 = 3.05$ | air space | |
| II { $L_5$ | $r_7 = +1,718.00$ | $d_7 = 5.60$ | 1.58267 | 46.5 |
| | $r_8 = -19.98$ | $d_8 = 0.10$ | air space | |
| $L_6$ | $r_9 = -19.98$ | $d_9 = 1.12$ | 1.65830 | 57.3 |
| | $r_{10} = +9.61$ | | | |

The relationship between the focal length $f_I$ of the front component I, the focal length $f_{II}$ of the rear component II, the focal length $f_1$ of front lens $L_1$, and the radii $r_1$, $r_3$ and $r_4$ of the system of FIG. 1 are listed in the following Table 1 which also gives the mean of the refractive indices $n_1$ to $n_4$ of the lenses $L_1$ to $L_4$ of the front component.

Table 1

$f_I = +42.40$ mm.
$f_{II} = -13.94$ mm.
$f_1 = +86.25$ mm.
$r_1 = 0.82\, f_I$

Table I—Continued $r_3 = 0.70\ f_I$
$|r_4| = 4.72\ f_I$
$\frac{1}{4}(n_1+n_2+n_3+n_4) = 1.676$ The system of FIG. 2 has a front component I' whose first member is a singled $L_1'$ which is similar to lens $L_1$ of FIG. 1 and has radii $r_1'$, $r_2'$ and a thickness $d_1'$. It is separated by a space $d_2'$ from a doublet composed of a biconvex lens $L_2'$ (radii $r_3'$, $r_4'$ and thickness $d_3'$) and a biconcave lens $L_3'$ (radii $r_4'$, $r_5'$ and thickness $d_4'$); the fourth lens of the front component I' is a meniscus-shaped positive singlet $L_4'$, having radii $r_6'$, $r_7'$ and thickness $d_6'$, which is separated from doublet $L_2'/L_3'$ by an air space $d_5'$. It will be noted that the configurations of lenses $L_2'$, $L_3'$ and $L_4'$ are also similar to those of the corresponding lenses in FIG. 1. Front component I' is separated by a large air space $d_7'$ from the rear component II' in which a nearly plano-convex positive lens $L_5'$ (radii $r_8'$, $r_9'$ and thickness $d_8'$) and a biconcave lens $L_6'$ (radii $r_9'$, $r_{10}'$ and thickness $d_9'$), each similar to the corresponding lens of FIG. 1, are cemented together to form a doublet.

Representative numerical values of the radii, thicknesses and separations of lenses $L_1'$ to $L_6'$ (in millimeters), of their refractive indices $n_d$ and of their Abbé numbers $\nu$ are given in the following Example B which concerns a front attachment designed to co-operate with the same type of objective as that described in connection with Example A.

EXAMPLE B

| Lens | Radii | Thicknesses and Air Spacings | $n_d$ | $\nu$ |
|---|---|---|---|---|
| I' { $L_1'$ | $r_1' = +34.72$ | $d_1' = 8.24$ | 1.62041 | 60.3 |
|  | $r_2' = +90.01$ | $d_2' = 0.35$ | air space |  |
| $L_2'$ | $r_3' = +33.68$ | $d_3' = 8.54$ | 1.69350 | 53.4 |
| $L_3'$ | $r_4' = -142.08$ | $d_4' = 1.93$ | 1.69895 | 30.1 |
|  | $r_5' = +27.10$ | $d_5' = 0.18$ | air space |  |
| $L_4'$ | $r_6' = +21.73$ | $d_6' = 7.65$ | 1.60311 | 60.7 |
|  | $r_7' = +42.60$ | $d_7' = 6.11$ | air space |  |
| II' { $L_5'$ | $r_8' = +1,588.00$ | $d_8' = 5.07$ | 1.58144 | 40.8 |
| $L_6'$ | $r_9' = -10.61$ | $d_9' = 1.01$ | 1.58313 | 59.3 |
|  | $r_{10}' = +8.14$ |  |  |  |

The relationship between the focal length $f_{I'}$ of the front component I', the focal length $f_{II'}$ of the rear component II', the focal length $f_{1'}$ of front lens $L_1'$, and the radii $r_1'$, $r_3'$ and $r_4'$ of the system of FIG. 2 are listed in the following Table 2 which also gives the mean of the refractive indices $n_{1'}$ to $n_{4'}$ of the lenses $L_1'$ to $L_4'$ of the front component.

Table 2

$f_{I'} = +42.40$ mm.
$f_{II'} = -13.99$ mm.
$f_{1'} = +85.78$ mm.
$r_1' = 0.82\ f_{I'}$
$r_3' = 0.79\ f_{I'}$
$|r_4'| = 3.35\ f_{I'}$
$\frac{1}{4}(n_{1'}+n_{2'}+n_{3'}+n_{4'}) = 1.654$ Although the linear parameters in the foregoing examples have been given in millimeters, it will be understood that these examples are equally valid for other units of length and that departures from the exact numerical values set forth therein, with adherence to the aforestated relationships between the focal length of the front component, the focal length of the front lens and certain radii of the first three lenses, are permissible within the spirit and scope of the invention as defined in the appended claims.

We claim:

1. An afocal front attachment for an optical objective, consisting of a positively refracting front component and a complementarily negatively refracting rear component, said front component being composed of a positive first, a positive second, a negative third and a positive fourth lens, said rear component being composed of a positive fifth and a negative sixth lens, at least said second and third lenses being cemented together and air-spaced from said first lens, said first lens and the member formed by said cemented lenses being each in the form of a positive meniscus having a respective convex surface turned toward the object side of the system, the cemented surface between said second and third lenses having a radius ranging between 3 and 5 times the focal length of said front component, said first lens having a focal length ranging between 1.5 and 2.5 times the focal length of said front component, the radius of the convex surface of said first lens turned toward said object side is greater than four-fifths but less than the whole of the focal length of said front component, the radius of the convex surface of said cemented member turned toward said object side ranges between 0.6 and 0.9 times the focal length of said front component, and the arithmetic mean of the refractive indices of said first, second, third and fourth lenses ranges between 1.6 and 1.75.

2. An attachment according to claim 1 wherein the cemented surface between said second and third lenses has a radius ranging between 3 and 5 times the focal length of said front component.

3. An attachment according to claim 2 wherein said fifth and sixth lenses are air-spaced from each other.

4. An attachment according to claim 3, adapted to co-operate with an objective system having a focal length of 13 units of length, wherein the radii $r_1$ to $r_{10}$ of said first through sixth lenses and the thicknesses and separations $d_1$ to $d_9$ thereof, given in said units of length, as well as the numerical values of their refractive indices $n_d$ and their Abbé numbers $\nu$ are substantially as listed in the following table:

| Lens | Radii | Thicknesses and Air Spacings | $n_d$ | $\nu$ |
|---|---|---|---|---|
| $L_1$ | $r_1 = +34.72$ | $d_1 = 7.00$ | 1.62230 | 53.1 |
|  | $r_2 = +89.96$ | $d_2 = 0.35$ | air space |  |
| $L_2$ | $r_3 = +29.74$ | $d_3 = 13.00$ | 1.62041 | 60.3 |
|  | $r_4 = -200.40$ |  |  |  |
| $L_3$ | $r_5 = +18.90$ | $d_4 = 5.00$ | 1.75520 | 27.5 |
| $L_4$ |  | $d_5 = 5.00$ | 1.66446 | 35.9 |
|  | $r_6 = +86.16$ | $d_6 = 3.05$ | air space |  |
| $L_5$ | $r_7 = +1,718.00$ | $d_7 = 5.60$ | 1.58267 | 46.5 |
|  | $r_8 = -19.98$ | $d_8 = 0.10$ | air space |  |
| $L_6$ | $r_9 = -19.98$ | $d_9 = 1.12$ | 1.65830 | 57.3 |
|  | $r_{10} = +9.61$ |  |  |  |

5. An attachment according to claim 2 wherein said fifth and sixth lenses are cemented together.

6. An attachment according to claim 5, adapted to co-operate with an objective system having a focal length of 13 units of length, wherein the radii $r_1'$ to $r_{10}'$ of said first through sixth lenses and the thicknesses and separations $d_1'$ to $d_9'$ thereof, given in said units of length, as well as the numerical values of their refractive indices $n_d$ and their Abbé numbers $\nu$ are substantially as listed in the following table:

| Lens | Radii | Thicknesses and Air Spacings | $n_d$ | $\nu$ |
|---|---|---|---|---|
| $L_1'$ | $r_1' = +34.72$ | $d_1' = 8.24$ | 1.62041 | 60.3 |
|  | $r_2' = +90.01$ | $d_2' = 0.35$ | air space |  |
| $L_2'$ | $r_3' = +33.68$ | $d_3' = 8.54$ | 1.69350 | 53.4 |
| $L_3'$ | $r_4' = -142.08$ | $d_4' = 1.93$ | 1.69895 | 30.1 |
|  | $r_5' = +27.10$ | $d_5' = 0.18$ | air space |  |
| $L_4'$ | $r_6' = +21.73$ | $d_6' = 7.65$ | 1.60311 | 60.7 |
|  | $r_7' = +42.60$ | $d_7' = 6.11$ | air space |  |
| $L_5'$ | $r_8' = +1,588.00$ | $d_8' = 5.07$ | 1.58144 | 40.8 |
| $L_6'$ | $r_9' = -10.61$ | $d_9' = 1.01$ | 1.58313 | 59.3 |
|  | $r_{10}' = +8.14$ |  |  |  |

References Cited in the file of this patent
UNITED STATES PATENTS

| 2,425,400 | Shade | Aug. 12, 1947 |
| 2,660,093 | Bertele | Nov. 24, 1953 |
| 2,803,167 | Kohler et al. | Aug. 20, 1957 |
| 2,824,493 | Klemt | Feb. 25, 1958 |